US010429564B2

(12) United States Patent
Galarza

(10) Patent No.: US 10,429,564 B2
(45) Date of Patent: Oct. 1, 2019

(54) FIBEROPTIC LIGHTGUIDE AND METHOD OF MANUFACTURE

(71) Applicant: Sunoptic Technologies LLC, Jacksonville, FL (US)

(72) Inventor: Antonio Galarza, Jacksonville, FL (US)

(73) Assignee: Sunoptic Technologies LLC, Jacksonville, FL (US)

( * ) Notice: Subject to any disclaimer, the term of this patent is extended or adjusted under 35 U.S.C. 154(b) by 368 days.

(21) Appl. No.: 14/792,709

(22) Filed: Jul. 7, 2015

(65) Prior Publication Data

US 2016/0011356 A1    Jan. 14, 2016

Related U.S. Application Data

(60) Provisional application No. 62/022,350, filed on Jul. 9, 2014.

(51) Int. Cl.
  *G02B 6/44* (2006.01)
  *G02B 6/04* (2006.01)
  *F21V 8/00* (2006.01)
  *G02B 6/26* (2006.01)

(52) U.S. Cl.
  CPC .............. *G02B 6/0008* (2013.01); *G02B 6/04* (2013.01); *G02B 6/262* (2013.01); *G02B 6/4476* (2013.01)

(58) Field of Classification Search
  CPC ........ G02B 6/0008; G02B 6/04; G02B 6/262; G02B 6/4476; G02B 6/4479; G02B 6/2551; G02B 6/2552

USPC .......................................................... 385/115
  See application file for complete search history.

(56) References Cited

U.S. PATENT DOCUMENTS

| | | | |
|---|---|---|---|
| 5,002,359 A * | 3/1991 | Sayegh | G02B 6/443 385/107 |
| 5,422,971 A | 6/1995 | Honjo et al. | |
| 5,519,172 A * | 5/1996 | Spencer | H01B 3/44 174/110 R |
| 5,627,343 A * | 5/1997 | Brandolf | H02G 3/22 156/86 |
| 5,778,125 A | 7/1998 | Busse et al. | |
| 5,793,920 A * | 8/1998 | Wilkins | G02B 6/4446 385/135 |
| 5,812,728 A * | 9/1998 | Wanamaker | G02B 6/3878 385/139 |
| 5,815,619 A * | 9/1998 | Bloom | G02B 6/3855 385/60 |
| 6,009,610 A * | 1/2000 | Brandolf | H02G 3/22 285/381.1 |
| 6,282,348 B1 | 8/2001 | Carlisle et al. | |
| 6,996,315 B2 | 2/2006 | Henze et al. | |

(Continued)

*Primary Examiner* — Omar R Rojas
(74) *Attorney, Agent, or Firm* — Howson & Howson LLP

(57) ABSTRACT

A flexible lightguide having at least one fused fiberoptic end secured within an end fitting with a layer of cushioning material sandwiched between the fused fiberoptic end and end fitting. The layer of cushioning material accommodates the differences in thermal expansion and contraction of the fused fiberoptic end and end fitting to prevent damage to the fused fiberoptic end such as during multiple cycling in an autoclave. As one example, the layer of cushioning material may be provided by wrapping the fused fiberoptic end with PTFE tape, thread seal tape, or the like.

6 Claims, 3 Drawing Sheets

(56) References Cited

U.S. PATENT DOCUMENTS

| | | | |
|---|---|---|---|
| 7,197,217 B1 * | 3/2007 | Voyagis | C03B 37/028 385/115 |
| 7,308,807 B2 | 12/2007 | Gerstner et al. | |
| 7,526,165 B2 * | 4/2009 | Nielsen | G02B 6/02004 359/341.1 |
| 8,317,413 B2 * | 11/2012 | Fisher | G02B 6/2835 385/99 |
| 2006/0165358 A1 * | 7/2006 | Trebst | G02B 6/04 385/115 |
| 2007/0160334 A1 * | 7/2007 | Cobb | B60Q 1/50 385/116 |
| 2007/0237453 A1 * | 10/2007 | Nielsen | G02B 6/02004 385/28 |
| 2010/0129042 A1 * | 5/2010 | Fisher | G02B 6/2835 385/139 |
| 2010/0158457 A1 | 6/2010 | Drozd et al. | |
| 2010/0303425 A1 * | 12/2010 | Liu | G02B 6/3849 385/94 |
| 2012/0034403 A1 | 2/2012 | Paterek et al. | |
| 2014/0003776 A1 * | 1/2014 | Gibson | G02B 6/06 385/116 |

\* cited by examiner

FIBEROPTIC LIGHTGUIDE AND METHOD OF MANUFACTURE

CROSS-REFERENCE TO RELATED APPLICATION

This application claims the benefit under 35 USC § 119(e) of U.S. Provisional Patent Application No. 62/022,350, filed Jul. 9, 2014.

BACKGROUND

The present invention relates to a fiberoptic lightguide or cable and its method of manufacture, and more particularly, the present invention relates to a fiberoptic lightguide or cable having at least one fused end.

Fiberoptic illuminators and like light sources include a lamp and an aligned port providing a fiberoptic cable interface that permits an end fitting of a fiberoptic lightguide or cable to be connected to the light source. The lamp supplies a light beam into the end of the fiberoptic lightguide or cable, and the lightguide or cable transmits the light to an endoscope, boroscope, headlamp, or like device tethered to the illuminator via the lightguide or cable.

BRIEF DESCRIPTION OF THE DRAWINGS

The features and advantages of the present invention should become apparent from the following description when taken in conjunction with the accompanying drawings, in which.

DETAILED DESCRIPTION

Figure 1:
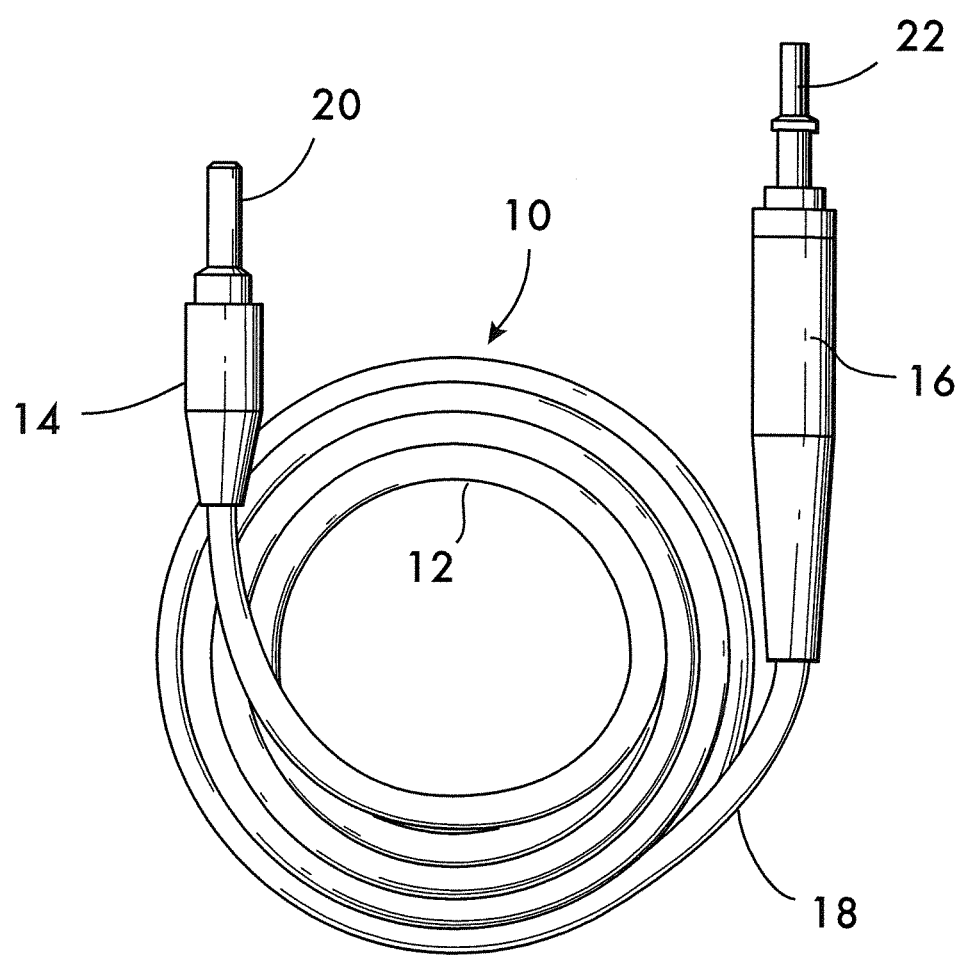
FIG. 1 is a view of a flexible fiberoptic lightguide or cable.

A flexible fiberoptic lightguide is shown in FIG. 1. The lightguide 10 includes an elongate cable 12 including a continuous length of a bundle of separate filaments and/or fibers, such as glass fibers, encased within a flexible sheathing 18. The lightguide 10 includes opposite ends, 14 and 16, having fitments or end fittings, 20 and 22. In use, one of the ends may be connected to a lightsource (not shown) while the opposite end is connected to a device, such as an endoscope, horoscope or the like (not shown).

According to an embodiment, the cable 12 is made of a bundle of a multitude of relatively small diameter fibers. By way of example, each fiber may have a diameter of about 50 microns thereby providing the lightguide 10 with great flexibility along its length between opposite ends, 14 and 16. Of course, other diameter fibers may be used provided a desired amount of flexibility may be obtained.

At one or both ends of the bundle of fibers, the fibers are fused together. The fusing together of the bundle of fibers increases packing fraction of the optic fibers and permits the bundle to transmit considerably more light due to the elimination of interstitial spaces that would otherwise exist between the fibers at the end of the bundle. Thus, the loss of light that may fall into such non-transmitting spaces between fibers is eliminated.

For purposes of fusing the fibers, a bundle of closely-packed, elongate optic fibers 34 may or may not be inserted into a hollow cladding of glass or the like and then heated and drawn to fuse the individual fibers within the bundle together. The individual fiber optic elements within the bundle may assume a hexagonal or like shape upon being subject to compression during the fusing process. Formation of a fused end eliminates the need for epoxy adhesives or the like that would otherwise be necessary to secure the end of the fiber bundle together. This eliminates the possibility of epoxy in an end of the lightguide connected to a lightsource from overheating and leading to a failure of the lightguide.

While the fused end provides certain advantages, it also may present a problem. For instance, as a result of fusing fibers together, the end of the bundle of fibers forms a solid glass mass subject to thermal expansion/contraction. The fused glass end of the fiber bundle is located within an annular end fitting which is typically made of metal, such as stainless steel used for its durability. Thus, both the fused glass end and the end fitting are subject to thermal expansion/contraction cycles. The fused glass and the metal end fitting are in contact, or in some cases, may be separated by an extremely thin line of epoxy adhesive. Each of these materials will expand at a different rate as determined by their coefficient of expansion and the amount of heat that each can absorb. As the glass is in the annulus of the end fitting, it is insulated and thus its expansion will necessarily be slower. Conversely, as the system cools, the end fitting will cool more quickly than the glass. The cooling end fitting may constrict the glass with sufficient compressive strength to cause the glass to crack, thus damaging the ability of the fused mass to pass light along the fibers.

For purposes of addressing the above referenced problem, a layer of cushioning material may be located between the fused end of the lightguide and the end fitting for purposes of accommodating the difference in expansion rates between the fused fiber mass and the annular end fitting. The layer of cushioning material must provide a necessary amount of accommodation between the end fitting and fused fiber mass and must entirely fill the space therebetween. Thus, it is important that the layer of cushioning material not permit any open gap to exist between the fused fiber mass and the interior of the endtip annulus of the end fitting to avoid capture of bioburden and the like which can lead to difficulty in sterilization.

In accordance to one embodiment, the layer of cushioning material is provided by wrapping the fused fiber mass with polytetrafluoroethylene (PTFE) tape, thread seal tape, or the like. By way of example, the tape can be wrapped about the fused fiber mass to a buildup thickness of about 0.006 inch. Of course, more or less thickness can be provided, as needed. The tape located between the fused fibers and the surrounding end fitting separates the fused fiber mass and end fitting while filling the space therebetween. The tape itself compresses and thereby cushions the fused fiber mass when the end fitting contracts and exerts a compressive force on the tape and fused fiber mass. Thus, the tape prevents the fused fiber mass from cracking when the lightguide is subject to multiple cycles of autoclaving. Without the tape, the fused fibers would fail as a result of such processing and the compressive force exerted by the end fitting during cooling.

Figure 2:
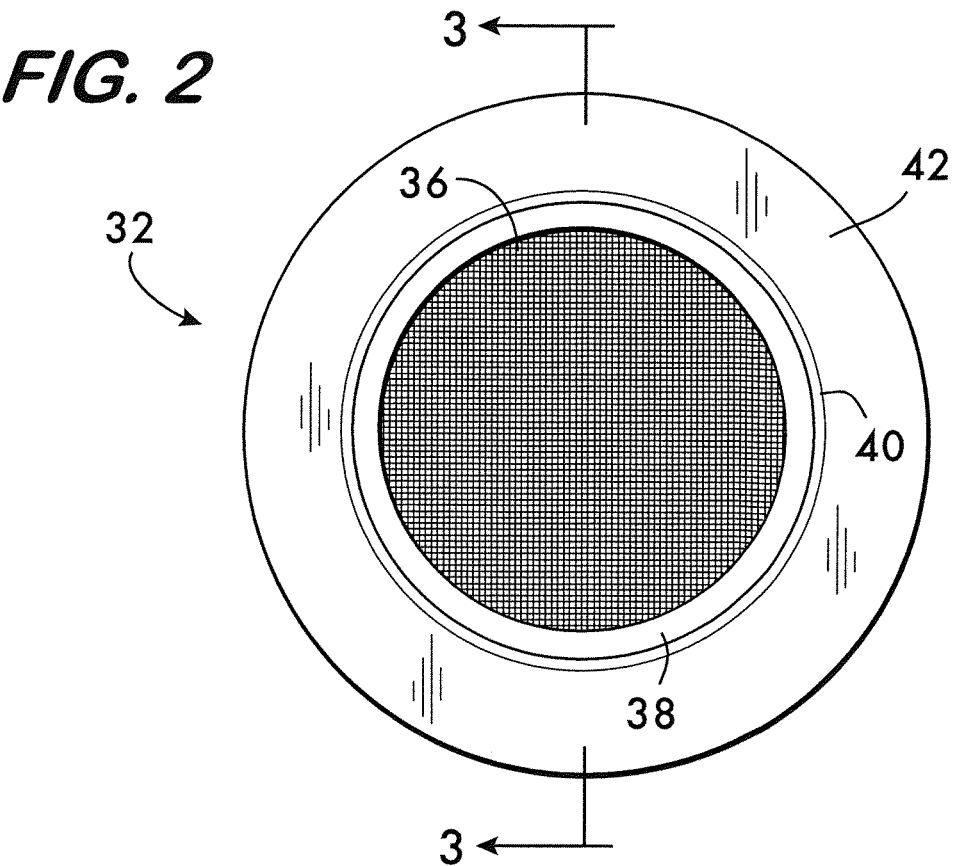
FIG. 2 is an enlarged plan view of an end of a fiberoptic lightguide or cable according to an embodiment.
Figure 3:
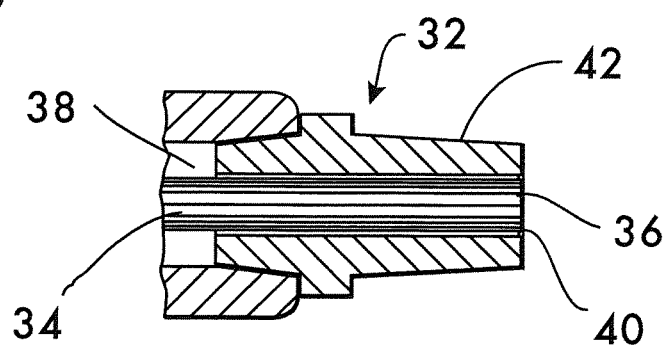
FIG. 3 is a cross-sectional view of an end of the fiberoptic lightguide or cable of FIG. 2 taken along line 3-3 of FIG. 2.

FIGS. 2 and 3 provide an example of an end 32 of a lightguide 30 according to an embodiment. A bundle of fibers 34 are fused together forming a fused fiberoptic core 36 at the end 32 of the lightguide 30. The fibers 34 are not fused together between opposite ends of the lightguide 30 for purposes of providing a flexible cable and are only fused together at one or both ends of the lightguide 30.

An outer jacket 38 made of a suitably matched glass extends about the fibers at the end 32. A layer 40 of cushioning material, such as PTFE tape, thread seal tape, or the like, is provided about the fused fiberoptic core 36. A rigid metal end fitting or other connector 42 is installed about the fused fiberoptic core 36 and layer 40. The layer 40 accommodates the difference in thermal expansion and contraction between the fused fiberoptic core 36 and the end fitting 42 and prevents damage to the fused fiberoptic core 36 upon such thermal cycling. The assembly of the fused fiberoptic core 36, layer 40, and end fitting 42 also eliminates any open spaces therein in which bioburden and the like may otherwise penetrate within the end 32 of the lightguide 30.

Materials other than PTFE or thread seal tape may be used to form the layer of cushioning material. Such materials may be applied in the form of tape, tubing, shrink wrap or tubing, extrusions cut to length, or machined or molded parts. The material of the layer of cushioning must be able to act as a shock absorber between the fused glass mass and annular metal end fitting and prevent entry of bioburden. The thickness of the layer of cushioning material may be scaled to a wide variety of bundle sizes to provide an appropriate amount of cushioning. The above described end structure can be applied to both ends of a fiberoptic lightguide or to only one end thereof.

Figure 4:
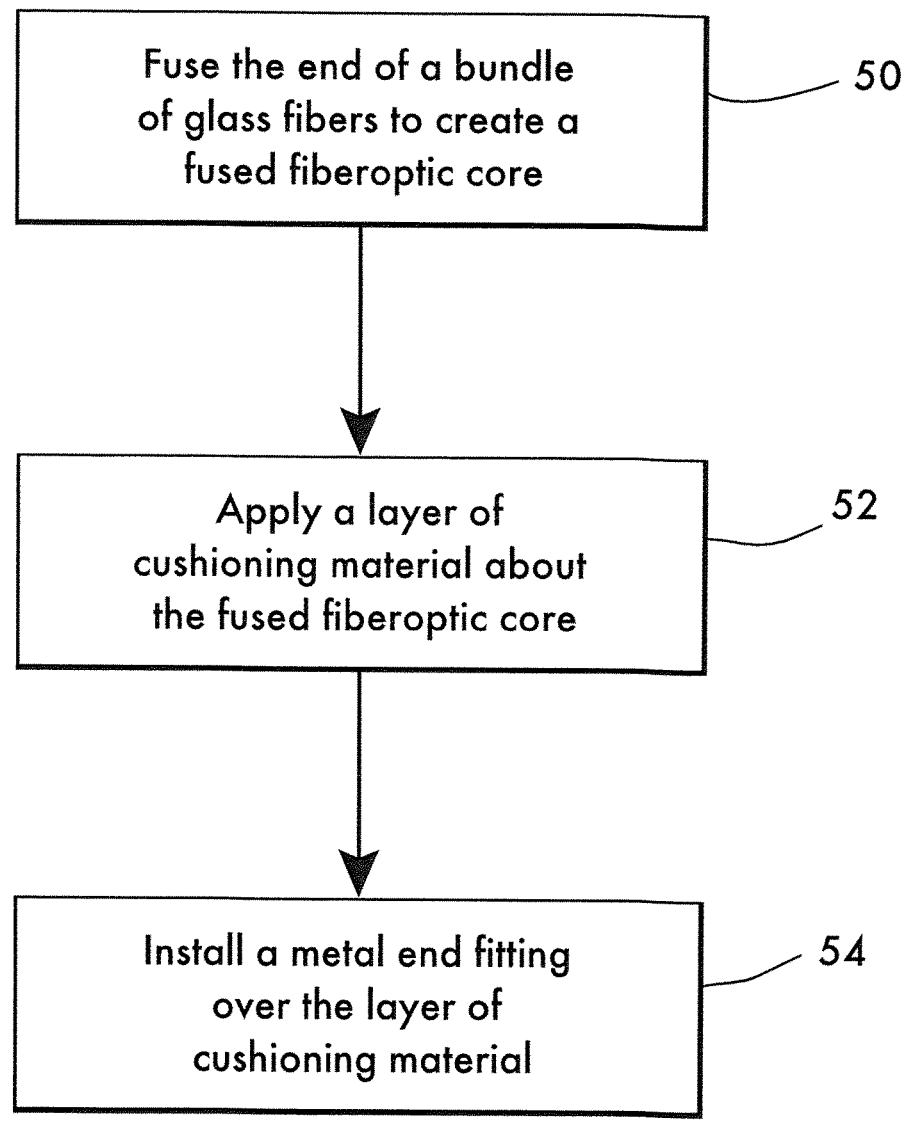
FIG. 4 is a diagram of method steps of forming the end of a fiberoptic lightguide or cable according to an embodiment.

FIG. 4 shows the process steps of making an end of a fiberoptic lightguide according to an embodiment. In step 50, the fibers in the bundle forming an end of the lightguide are subject to a fusing process in which the fibers are heated and drawn to become fused together eliminating any interstitial spaces between fibers. Thereafter, a layer of cushioning material is applied about the fused fibers in step 52. This may be applied in the form of tape wrapped about the fused fibers to a predetermined thickness. Of course, the layer of cushioning material may also be applied over the fused fibers by other processes and in other forms. In step 54, the end fitting is installed over the fused fibers with the layer of cushioning material sandwiched therebetween. Thus, when the end of the lightguide is subject to multiple cycles of autoclaving, the layer of cushioning material prevents the end fitting from damaging or cracking the fused fibers contained therein when expanding and/or contracting.

While an embodiment of a lightguide, fused end of a lightguide, layer of cushioning material, and process of making a lightguide have been described in detail, various modifications, alternations, and changes may be made without departing from the spirit and scope of the lightguide and method of manufacture according to the present invention as defined in the appended claims.

The invention claimed is:

1. A method of manufacturing a lightguide, comprising the steps of:

fusing an end of a bundle of elongate glass fibers forming a fiberoptic cable to produce a solid fused fiberoptic core of solid glass at the end of the cable such that the bundle of elongate fibers remains flexible along a length of the cable except at the end having the solid fused fiberoptic core in which all interstitial spaces between fibers within the solid fused fiberoptic core have been eliminated;

applying a layer of cushioning material of a predetermined thickness about the fused fiberoptic core at the end of the fiberoptic cable by wrapping a flexible polytetrafluoroethylene (PTFE) tape about the fused fiberoptic core;

after wrapping the PTFE tape about the fuse fiberoptic core, applying a metal end fitting about the fused fiberoptic core with the layer of cushioning material sandwiched therebetween to space the fused fiberoptic core from the end fitting; and subjecting the fiberoptic cable to thermal expansion and contraction cycling within an autoclave, the solid fused fiberoptic core of solid glass enclosed within the metal end fitting contracting at a slower rate of contraction relative to the metal end fitting as the metal end fitting and solid fused fiberoptic core cool;

the layer of cushioning material being able to accommodate differences in thermal expansion and contraction between the solid fused fiberoptic core and end fitting to prevent damage to the fused fiberoptic core during the thermal cycling and being positioned to accommodate the difference in the rate of contraction between the solid fused fiberoptic core and the metal end fitting to thereby prevent cracking of the slower cooling and contracting fused fiberoptic core relative to the faster cooling and contracting metal end fitting during the thermal cycling.

2. A method according to claim 1, wherein the diameter of each of the fibers is about 50 microns.

3. A method according to claim 1, wherein, as a result of applying the layer of cushioning material and the end fitting, no interstitial spaces remain within the end fitting.

4. A method according to claim 1, wherein the predetermined thickness is about 0.006 inch.

5. The method according to claim 1, wherein the end fitting is made of stainless steel.

6. The method according to claim 1, wherein said fusing step includes fusing both ends of the bundle of elongate fibers to produce solid fused fiberoptic cores at both ends of the fiberoptic cable such that the bundle of elongate fibers remains flexible between the ends, wherein both ends are wrapped with flexible polytetrafluoroethylene (PTFE) tape, wherein end fittings are applied over both taped ends.

* * * * *